(12) United States Patent
Dybdal et al.

(10) Patent No.: US 6,421,008 B1
(45) Date of Patent: Jul. 16, 2002

(54) METHOD TO RESOLVE INTERFEROMETRIC AMBIGUITIES

(75) Inventors: Robert Bernhard Dybdal, Palos Verdes Estates; Paul Randall Rousseau, Manhattan Beach, both of CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/781,614

(22) Filed: Feb. 12, 2001

(51) Int. Cl.[7] .............................. G01S 5/02; G01S 13/00
(52) U.S. Cl. ...................................... 342/424; 342/156
(58) Field of Search .................................. 342/424, 156

(56) References Cited

U.S. PATENT DOCUMENTS 5,572,220 A * 11/1996 Cai .............................. 342/424

OTHER PUBLICATIONS

L.G. Bullock et al., "An Analysis of Wide–Band Microwave Monopulse Directon–Finding Techniques," *IEEE Transactions on Aerospace and Electronic Systems*, vol. AES–7, No. 1, Jan. 1971.
R.B. Dybdal, "Monopulse Resolution of Interferometric Ambiguities," *IEEE Transactions on Aerospace and Electronic Systems*, vol. AES–22, No. 2, Mar. 1986.
R.B. Dybdal and P.R. Rousseau, "Resolution of Interferometric Ambiguities," *2000 IEEE APS Symposium Digest, Jul. 16–21, 2000*, pp. 1964–1967.

* cited by examiner

*Primary Examiner*—Thomas H. Tarcza
*Assistant Examiner*—Fred H. Mull
(74) *Attorney, Agent, or Firm*—Henricks, Slavin & Holmes LLP

(57) ABSTRACT

A method for resolving interferometric ambiguities for an interferometer system with antenna elements employs multiple interferometric elements within the baseline. The overall accuracy of the interferometer system results from the interferometric elements with the longest baseline dimension; the remaining interferometric elements provide a means to correctly resolve ambiguities. According to the method, the baseline locations of additional elements are determined by using an integer fractional location. By so doing, the ambiguities of the overall baseline correspond to a limited number of ambiguities of the fractional baseline so that many of the ambiguities of the overall baseline can be eliminated. According to a preferred method, baseline values are selected to obtain a high probability of correct ambiguity resolution with a minimum number of additional interferometric elements. In this way, the design complexity is reduced. This alignment also provides an ambiguity resolution method that is independent of frequency. According to a preferred method, synthetic baselines are created by electronically combining interferometric elements to produce baseline values that are smaller than those limited by the physical separation between interferometric elements. These synthetic baselines provide additional means to resolve interferometric ambiguities.

29 Claims, 3 Drawing Sheets

METHOD TO RESOLVE INTERFEROMETRIC AMBIGUITIES

STATEMENT OF GOVERNMENT INTEREST

The invention was made with Government support under contract F04701-93-C-0094 by the Department of the Air Force. The Government has certain rights in the invention.

BACKGROUND OF THE INVENTION

1. Field of Invention

The present invention relates generally to phase interferometric antenna systems that measure the direction of the received signal and, more specifically, to methods for resolving phase ambiguities in phase interferometers that provide direction finding capabilities over a wide field of view and bandwidth.

2. Description of the Related Art

Interferometric systems measure the direction of arrival of signals received by the antenna elements comprising the interferometer. The interferometer antenna system consists of an array of antenna elements separated by known distances. These distances are commonly referred to as baselines. In operation, the phase difference of the signals received by the antenna elements is measured and used to establish the signal arrival direction. For example, if the antenna elements are located on a planar surface and if the signal arrives normal to the surface, then signal outputs of each antenna element are in phase, and the relative phase difference between the elements is ideally zero. If the signal arrives obliquely to the plane, the phase differences between the elements vary dependent on the signal frequency, the baseline values and signal direction. The arrival direction of the signal is then derived based on the phase difference values between the antenna elements comprising the interferometer.

A problem arises, however, because the phase between the elements can only be measured over a 360° range. When the baseline dimension exceeds one half of the wavelength of the incident signal, the phase difference between antenna elements can span more than 360 degrees. Consequently, more than one possible signal arrival direction can be obtained, and these multiple arrival directions are commonly referred to as ambiguities. What is needed is a way to determine the proper ambiguity so that the direction of the signal can be uniquely and correctly determined.

In practice, the design of an interferometric system must satisfy three requirements. First, the antenna elements must have sufficient sensitivity to detect the signals of interest. Second, the angular accuracy depends on the maximum baseline dimension and the accuracy with which the phase difference values can be measured. Third, the design must be able to detect and locate signals over a required field of view and a required frequency range.

These three requirements have some apparent conflicts. The antenna element size must be sufficiently large to receive an adequate signal level. The physical size of the element derived from the sensitivity requirement limits the separation between elements because the elements cannot physically overlap. Thus, a lower bound exists on element spacing. When the antenna element size exceeds one half wavelength, ambiguities exist even when the elements are touching. The overall baseline dimension is determined from the angular accuracy requirement, required field of view and frequency of operation, and the phase measurement accuracy. Increasing the baseline dimension, i.e., the overall separation between elements, increases the angular accuracy of the solution and the number of phase ambiguities but reduces the spacing between ambiguities. The ability to meet the field of view requirement results from having antenna elements that achieve the required sensitivity over the field of view; but the broad antenna coverage conflicts with high antenna gain levels that may be needed for sensitivity requirements. Thus, the design of practical interferometers requires examination of these requirements and resolution of the conflicts between them.

Interferometers are configured for a variety of applications, and consequently have differing approaches to the problem posed by the ambiguities. Interferometers with narrow field of view requirements and relatively high gain levels (to meet sensitivity requirements) typically use aperture antennas that can also provide monopulse-processing capabilities. Monopulse processing uses two types of antenna patterns produced in the same aperture, a sum beam and a difference beam. The sum beam provides the signal reception, and the combined processing of the sum and difference beams provides a coarse estimate of the signal direction. The coarse estimate of the signal arrival direction is obtained from the ratio of the signals received by the difference and sum beams and its sign. To first order, the ratio of the difference signal and the sum signal linearly increases as the signal arrival direction moves away from the antenna's axis. The sign of this ratio changes depending on which side of the antenna's axis corresponds to the signal arrival direction. For example, the sign can be positive for signals arriving to the left of the antenna's axis and negative for signals arriving to the right of the antenna's axis. Thus, by measuring the ratio of the difference and sum signals and the sign of this ratio, a coarse estimate of the signal arrival direction can be determined.

When the above method is applied to narrow field of view interferometers, the interferometric elements have a monopulse processing capability. The coarse estimate of the signal arrival direction derived from the monopulse processing of the interferometric element is used to resolve the correct signal arrival direction from the possible interferometric ambiguities. The overall accuracy of the signal arrival direction is achieved from the interferometric processing and is significantly better than the accuracy provided by the monopulse processing of the interferometric elements. Thus, the overall angular accuracy of the system depends on the interferometric measurement, and the monopulse processing identifies the correct signal arrival direction from the possible ambiguities of the interferometer.

In practice, if the baseline of the interferometer is about five times the diameter of the elements, the ambiguities can be resolved with high confidence. The overall angular accuracy of such an interferometer is about ten times better than the monopulse estimate provided by the interferometric antenna element. One advantage of this method is that the ambiguity resolution is not frequency dependent so that the system can be used to locate signals over a very wide bandwidth. Frequency increases also improve the accuracy of the monopulse estimate of signal arrival, offsetting the reduction in the angular separation between phase ambiguities. Similarly, frequency decreases reduce the accuracy of the monopulse estimate of the signal arrival, offsetting the increase in the angular separation between phase ambiguities. Thus, the ability to resolve phase ambiguities by monopulse processing persists over a very broad bandwidth. Similar frequency independent operation is desired for interferometers for wide field of view applications.

Another method to resolve interferometric ambiguities is commonly used by the radio astronomy community. In this application, the antenna elements are widely separated and have a very large number of ambiguities. However, the required sensitivity for this application requires very long time periods to integrate the signal for detection. During this long integration period, the earth rotates, and this rotation of the earth provides the ambiguity resolution. This method cannot be used without motion between the interferometer and the signal and when the signal arrival direction must be determined in a timely fashion.

Yet another method applies to the case where a wide field of view is required. In this case, the interferometric elements have a broad pattern to meet the field of view requirements and are small and relatively inexpensive. A common approach to ambiguity resolution uses multiple elements within the overall baseline. These additional elements and their smaller baseline values have a reduced number of ambiguities. The minimum spacing between elements is limited to the size of the elements and this baseline has the minimum number of ambiguities. In fact, if this separation is less than one-half wavelength, no phase ambiguities can occur.

The above method, however, has several shortcomings. The system complexity and expense grow with the number of elements. The element size may be sufficient to physically preclude a one-half wavelength spacing between elements. If the system is required to operate over wide bandwidths, then the ambiguity resolution problem is more complex because the number of ambiguities and the combination of baseline values for ambiguity resolution increase. The physical size of these elements can exceed the one-half wavelength separation that produces ambiguity-free operation particularly when broad bandwidth operation is required. Wide bandwidth systems often use frequency independent antenna elements such as spiral antennas or log periodic antennas. While such elements can incorporate monopulse processing, the accuracy of the monopulse elements does not vary with frequency because the broad antenna coverage is also frequency independent. Thus, the previously cited method of using monopulse processing to resolve phase ambiguities does not work over wide bandwidths with broad coverage, frequency independent antennas.

A method for reliably and correctly resolving phase ambiguities with minimum system complexity is needed for applications having wide field of view, high angular accuracy and wide bandwidth requirements. A method for selecting baseline dimensions in such a way as to minimize the required number of interferometric elements is needed. An ambiguity resolution methodology that is not limited by the physical constraints dictated by the element dimensions is also needed.

SUMMARY OF THE INVENTION

The present invention pertains to wide field of view interferometric systems that have high angular accuracy and require operation over wide bandwidths. In such designs, the individual interferometric elements have wide fields of view and consequently are relatively small. Multiple elements within the overall baseline provide a means to resolve the interferometric ambiguities, and have baseline dimensions that are smaller than the overall baseline value. According to a preferred embodiment of the present invention, a method is provided for selecting fractional baseline values and for synthetically obtaining additional baseline values without incurring the expense and complexity of additional interferometric elements. According to a preferred embodiment of the present invention, the number of interferometric elements is minimized while still providing reliable phase ambiguity resolution.

A method for resolving interferometric ambiguities according to an exemplary preferred embodiment of the present invention first involves determining the overall baseline dimension from the angular accuracy requirements of the interferometric system together with the achievable phase measurement accuracy. A baseline dimension for a secondary element to be located within the overall baseline is selected to produce ambiguities that coincide with a limited number of the ambiguities of the overall baseline. This condition is achieved by using secondary elements in locations that are integer fractions of the overall baseline dimension. Thus, the overall baseline equals 4, 5, 6, etc. times the fractional baseline. The ambiguities of the overall baseline are more numerous than the ambiguities of the fractional baseline. The ambiguities of the two baselines that coincide represent possible signal directions. The ambiguities of the overall baseline that do not coincide with the ambiguities of the smaller fractional baseline can be eliminated as possible signal directions. The spacing between the ambiguities increases and decreases as the frequency of operation decreases and increases, respectively. Thus, this method for selecting baseline dimensions immediately reduces some ambiguities from consideration, and also provides a method that is frequency independent.

The fractional baseline value together with its phase measurement accuracy is selected to have sufficient angular accuracy to resolve the separation between the ambiguities of the overall baseline correctly and reliably. Like the overall baseline, the angular accuracy of the fractional baseline depends on the accuracy of measuring the phase difference between elements. This phase measurement accuracy is determined, in a preferred embodiment, by constructing an error budget composed of the individual error sources limiting phase measurement accuracy. These errors include the uncertainties caused by thermal noise sources, imperfections in the phase response of the elements and knowledge of their positions, bias errors resulting from insertion phase differences in the cabling, phase tracking limitations in receiver electronics, etc. If the statistics and confidence intervals of the phase measurement accuracy are known, a probability of correct ambiguity resolution can be derived and the integer fraction can be determined to meet these confidence values.

The reliable resolution of ambiguities requires the angular accuracy of the fractional baseline to be better than the angular separation between the ambiguities of the overall baseline. In many cases, however, the element size and bandwidth requirements preclude a separation that is less than one half wavelength. In other cases, the angular accuracy requirements are also accompanied by separations between ambiguities that are too small to be reliably resolved by a single additional baseline element.

According to an exemplary preferred embodiment of the present invention, if ambiguities persist, additional elements can be inserted within the baseline, and the process continued. Ultimately, the resulting fractional baseline is shorter than the minimum physical separation between interferometric elements that is dictated.

According to an exemplary preferred embodiment of the present invention, a synthetic baseline is obtained by arraying the two elements with the smallest separation. When two interferometric elements are combined, the phase center of the resulting array lies between the elements. The phase center location depends on the amplitude ratio of their combining and can be varied to produce different baseline values. For example, when the elements are equally combined, the phase center lies exactly between the two elements. The array pattern of the combined elements differs from the element pattern and is examined to insure that the array provides adequate gain over the design field of view. For broad coverage antennas used by wide field of view applications, the antenna elements are usually sufficiently small that the arrayed pattern is acceptable. The synthetic baseline of the present invention solves the shortcoming imposed by an inability to physically overlap interferometric elements.

In accordance with one embodiment of the present invention, a method for resolving interferometric ambiguities for an interferometer system with antenna elements which define an overall baseline includes the steps of: employing an angular accuracy requirement and an achievable phase measurement accuracy to determine an overall baseline dimension for the interferometer system; selecting a secondary element baseline dimension, for a secondary element to be located within the overall baseline, as an integer fraction of the overall baseline dimension, the secondary element and one of the antenna elements defining a fractional baseline, such that ambiguities produced by the fractional baseline coincide with a portion of ambiguities produced by the overall baseline; and eliminating from consideration as possible signal directions the ambiguities of the overall baseline that do not coincide with the ambiguities of the fractional baseline. In a preferred embodiment, the fractional baseline and a phase measurement accuracy of the fractional baseline are selected to provide sufficient angular accuracy to resolve separations between the ambiguities of the overall baseline. In a preferred embodiment, the phase measurement accuracy of the fractional baseline is determined by constructing an error budget composed of one or more error sources that limit phase measurement accuracy. The error sources include (but are not limited to) one or more of: uncertainties caused by thermal noise sources, imperfections in a phase response of the elements and knowledge of positions of the elements, bias errors resulting from insertion phase differences in cabling, and phase tracking limitations in receiver electronics. In a preferred embodiment, a probability of correct ambiguity resolution is derived from statistics and confidence intervals of the phase measurement accuracy, and the integer fraction is selected to meet the statistics and confidence intervals. In a preferred embodiment, the method further includes the step of locating additional elements within the overall baseline if ambiguities still persist.

In accordance with another embodiment of the present invention, a method for resolving interferometric ambiguities for an interferometer system with interferometric elements that define an overall baseline includes the steps of: employing an angular accuracy requirement and an achievable phase measurement accuracy to determine an overall baseline dimension for the interferometer system; and inserting one or more additional interferometric elements within the overall baseline such that baseline dimensions of the additional interferometric elements are integer fractions of the overall baseline dimension, the integer fractions being selected to provide ambiguity resolution that meets a required confidence value. In a preferred embodiment, the one or more additional interferometric elements comprise actual antenna elements. In a preferred embodiment, the step of inserting one or more additional interferometric elements includes creating a synthetic baseline by electronically combining the interferometric elements. In a preferred embodiment, the dimension of the synthetic baseline is smaller than dimensions of baselines limited by physical separations between the interferometric elements.

In accordance with another embodiment of the present invention, a method for resolving interferometric ambiguities for an interferometer system with antenna elements includes the steps of: combining two elements of the interferometric system such that the combined elements have a phase center; producing a synthetic baseline whose dimension is a separation between one of the combined elements and the phase center of the combined elements; and employing the synthetic baseline to resolve ambiguities that cannot be resolved by baselines between the antenna elements. In a preferred embodiment, the dimension of the synthetic baseline is smaller than a separation between the combined elements. In a preferred embodiment, the combined elements have a smaller separation than any two elements of the interferometric system. In a preferred embodiment, the combined elements are combined such that the synthetic baseline is one half the size of the baseline between the combined elements. In a preferred embodiment, the combined elements are combined with an unequal amplitude combination.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

Detailed description of preferred embodiments of the invention will be made with reference to the accompanying drawings.

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention.

Figure 1:
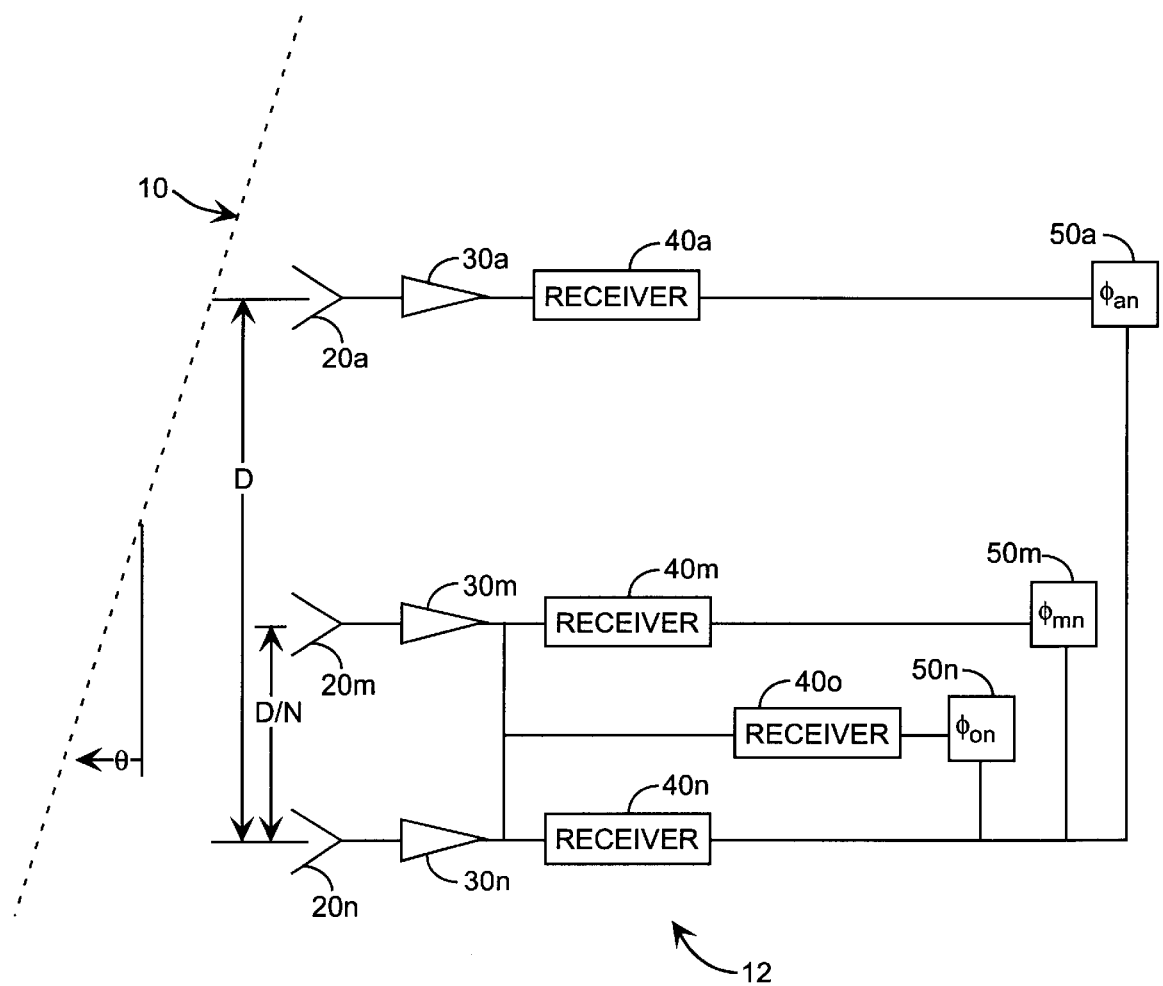
FIG. 1 is a block diagram illustrating an exemplary preferred interferometer according to the present invention and a wavefront containing an incident signal.

FIG. 1 shows an incident wavefront 10 arriving obliquely to an exemplary preferred interferometer system 12 according to the present invention and, more specifically, to antenna elements 20a–20n of the interferometer 12 making an angle θ with respect to the elements. The signal received from the incident wavefront 10 by each of the interferometric antenna elements 20a–20n is preamplified by low noise amplifiers 30a–30n to establish the system noise level. After preamplification, the signal is routed to receivers 40a–40n where the signal is downconverted and reduced in bandwidth to isolate the signal of interest from other signals that could possibly interfere with the signal of interest. Each interferometric element in FIG. 1 has its own receiver 40a–40n to detect the signal. An additional receiver 40o is used after the power combiner 35 to produce a signal output to illustrate the feature of creating a synthetic baseline. Phase detectors, 50a–50m, measure the phase difference between interferometric element outputs; the additional phase detector 50n measures the phase difference of the synthetic baseline formed by the array combination of elements 20m and 20n by the power combiner 35. The components of the interferometer system 12 thus comprise n antenna elements 20a–20n, n preamplifiers 30a–30n, n receivers 40a–40n (one for each element), an additional receiver 40o used with the synthetic baseline, n–1 phase detectors 50a–50m, a power combiner 35, and an additional phase detector 50n for the synthetic baseline.

The interferometric elements of FIG. 1 are shown as a linear array on a planar surface. It should be appreciated, however, the principles of the present invention are also applicable to arrays of interferometric elements that are not arranged in a linear geometry as well as to interferometric elements on surfaces which are not planar.

The overall baseline has a dimension D and the interferometric output from the two elements 20a, 20n provides the overall angular accuracy. An additional element 20m within the overall baseline with a baseline dimension D/N, N being the integer, produces less angular accuracy and is used to resolve the interferometric ambiguities. The linear array as described provides interferometric estimates of the signal arrival direction in a single angular coordinate. In a preferred embodiment, a second set of interferometric elements (not shown in FIG. 1 for the sake of clarity) is used and arranged orthogonal to the first set of elements to obtain signal arrival direction estimates in the second angular coordinate. Preferably, these two sets of interferometric elements share a common interferometric element and associated electronics to reduce system cost and complexity.

In the illustrated example of FIG. 1, the incident wavefront 10 carrying the signal is obliquely incident on the interferometric antenna elements 20a–20n so that the phase of the signal varies from element to element. Because the phase can be measured only over a 360° range, multiple signal locations corresponding to the phase ambiguities exist. The measured phase difference equals $2\pi$ times the electrical length of the baseline (the physical length divided by the wavelength) multiplied by the sine of the incidence angle $\theta$. This measured phase difference is the principal value of the phase and the undetermined modulus corresponds to the ambiguities. Thus, the incidence angle is related to the phase difference between the individual elements. An increase in the electrical length of the baseline for a given phase measurement accuracy produces an increase in the angular accuracy in the signal location but a decrease in the separation between the phase ambiguities.

Figure 2:
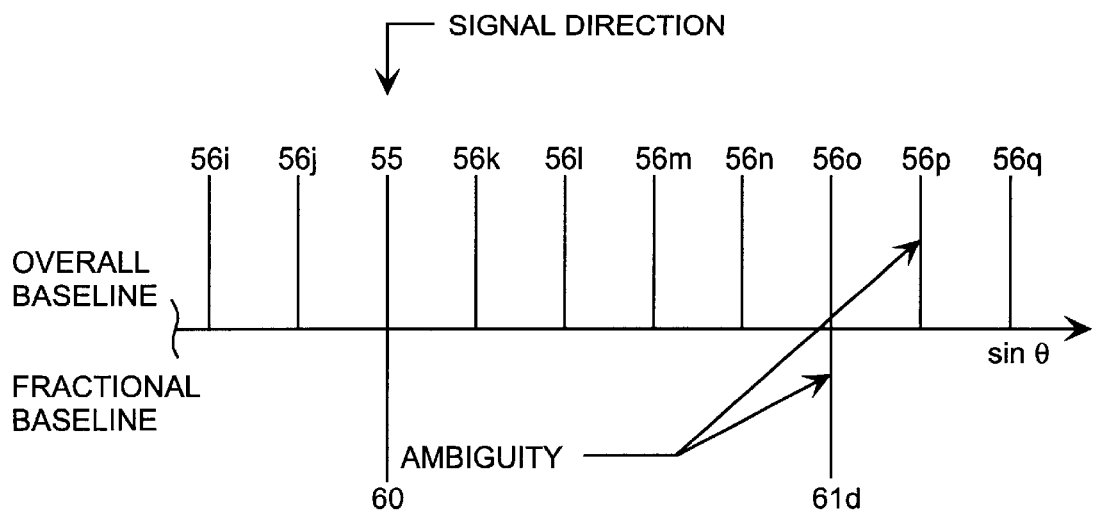
FIG. 2 illustrates the ambiguous response of the overall baseline and the fractional integer baseline and their alignment.

When an additional element is inserted within the overall baseline, the overall baseline provides high angular accuracy. The shorter baseline has less angular accuracy but fewer phase ambiguities. According to the present invention, the smallest baseline consistent with ambiguity resolution requirements is employed so that the number of additional interferometric elements is reduced and the system complexity is minimized. This situation is illustrated in FIG. 2, where the phase measurement accuracy is ideally precise and, as an example, the fractional baseline is ⅕ of the overall baseline. The overall baseline illustrated above the x-axis in FIG. 2 produces a response that is aligned with the signal direction 55 along with numerous ambiguities, 56i to 56q being indicated. The fractional baseline illustrated below the x-axis in FIG. 2 also produces a response that is aligned with the signal direction 60, but because of its reduced baseline dimension, its response has fewer ambiguities, 61d being indicated. In both cases, the ambiguity spacing corresponds to a 360° change in the phase difference between elements. Those ambiguities of the overall baseline that do not coincide with responses of the fractional baseline can be rejected from further consideration. The ambiguities are regularly spaced when plotted as in FIG. 2 on a scale proportional to the sine of the incidence angle.

Figure 3:
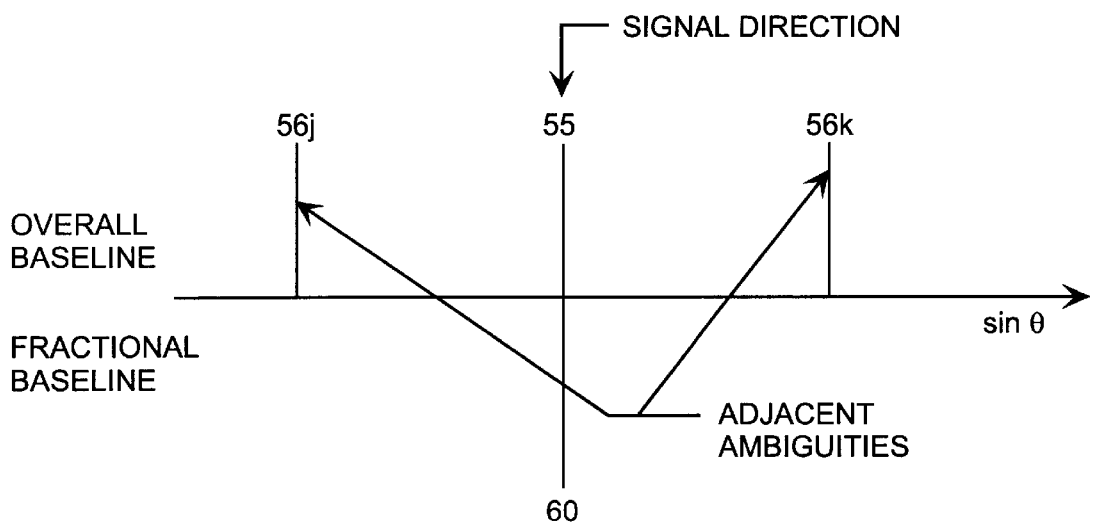
FIG. 3 describes the interferometric responses of the overall baseline and its adjacent ambiguities, the response of the fractional integer baseline, and the probability distribution of signal location values caused by phase measurement errors.
Figure 3:
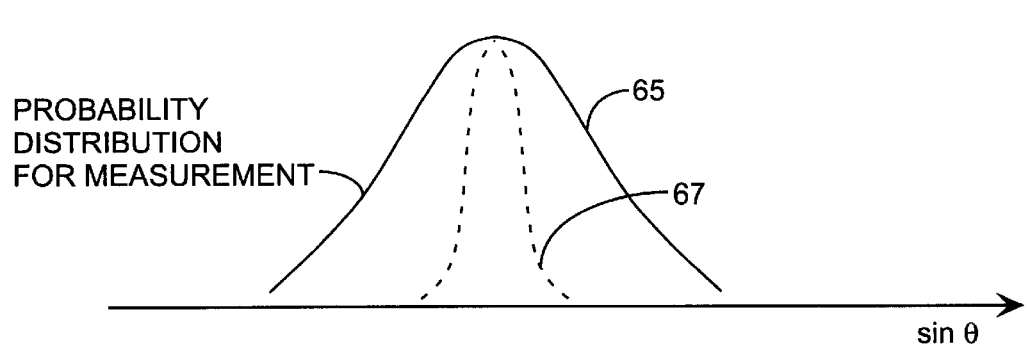

The expanded view in FIG. 3 illustrates why the integer fractional baseline dimensions are selected for the additional element positions and the method of the present invention for addressing the probability of correct ambiguity resolution. In practical designs, the phase difference between the elements cannot be measured with ideal precision. A variety of factors limit the accuracy with which the phase can be measured and include the effects of noise, imperfections in the electronics, imbalance in the cabling connecting the antenna elements, and so forth. These inaccuracies limit the precision and result in a statistical variation in the measurement. This statistical distribution of the measurement accuracy is described by probability distributions 65 and 67, which are illustrated in the lower portion of FIG. 3. For the overall baseline, the statistical distribution 67 of the measurement error provides the means to quantify the overall measurement accuracy. Similarly, for the fractional baseline, the statistical distribution 65 provides the ability to resolve the ambiguities and addresses the probability of correct ambiguity resolution. The phase measurement accuracy between elements is assumed to be identical in all cases because each element receives the same signal to noise ratio, and has similar electronics and cabling imperfections in practical designs. However, uncertainty of the angular accuracy varies inversely with the baseline dimension so that the ratio of the angular accuracy of the overall baseline to the angular accuracy of the fractional baseline equals the ratio of the fractional baseline to the overall baseline.

While the statistical description of the phase measurement accuracy depends on the specifics of the system design and the amount of signal power that is available for the phase measurement, the following example illustrates the application of these techniques and the means to determine the probability of correct ambiguity resolution. The probability distribution of the phase measurement accuracy is assumed to follow the well-known Gaussian distribution. Such a distribution is realized in practice when the phase measurement errors are dominated by thermal noise errors, and the system has been carefully designed to minimize other error sources. The confidence interval for Gaussian statistics is well known. The statistics are characterized by a standard deviation and, for example, when the distribution spans 3.3 times this standard deviation value, the confidence that the measurement falls within this interval is 99.9%. Thus, if the phase measurement errors for the smaller fractional baseline fall within the statistical confidence interval and the interval is less than the span between ambiguities, the ambiguities are resolved within the confidence of the phase measurement accuracy of the smaller fractional baseline.

The rationale for selecting integer fractional baseline values is further revealed through the following example. For the integer fractional baseline, the ambiguities of the overall baseline 56j and 56k are symmetrically displaced from the response of the integer fractional baseline 60. If the phase measurement accuracy has a symmetric probability distribution, the probabilities of resolving the adjacent ambiguities 56j and 56k of the overall baseline are identical. If the smaller baseline 60 for ambiguity resolution had a value that was not an integer, the ambiguities of the overall baseline 56j and 56k would not symmetrically straddle the response of the smaller baseline 60. The consequence of not symmetrically straddling the ambiguities is that the probability of resolving adjacent ambiguities is no longer equal. To achieve the same confidence in resolving ambiguities, the value of the smaller baseline would have to be increased to improve its angular accuracy so that the same statistical confidence would be achieved. If the smaller baseline has a larger value, then a greater number of additional interferometric elements are required to resolve the total number of possible ambiguities. Thus, a means of determining the probability of correct ambiguity resolution, the rationale for using integer fractional baselines, and the ability to minimize the number of interferometric elements and design complexity are revealed herein.

The example statistics together with the phase measurement accuracy provide the means to determine the integer fractional baseline dimensions. Consider phase measurement accuracy values whose standard deviations are 20°, 10°, and 5° as examples. For 99.9% confidence in correctly resolving adjacent ambiguities, 3.3 times the standard deviation of the phase measurement errors transformed to the angular uncertainty is required to be less than the angular uncertainty between the adjacent ambiguities 56j and 56k. The angular uncertainty of the overall and smaller baseline is the inverse ratio of their baseline dimensions, and the spacing between ambiguities spans a 360° change in phase. Thus, the standard deviation of the phase measurement accuracy multiplied by 3.3 and multiplied by the integer value must be less than the 360° span between adjacent ambiguities of the overall baseline. The integer values for these example phase measurement accuracy values are 5, 10, and 21. Phase measurement accuracy, confidence in resolving ambiguities and system complexity play important roles in developing practical designs, with different varieties of tradeoffs being examined depending upon the specifics of the system application involved.

The angular accuracy, as discussed, determines the overall baseline values. For very long baseline values, e.g. 50 wavelengths, a single additional element may not be adequate. For example, if the integer value is 10, the smaller baseline would have a 5-wavelength dimension, and its ambiguities may still be too numerous to achieve a unique signal direction. The smaller baseline could be again divided into a second fractional baseline to further resolve the ambiguities. It should be appreciated that if an integer fractional value is not used, the adjacent ambiguities are not symmetrically straddled, and for the same confidence of resolving the closest ambiguity, the baseline dimension of the additional element must be increased. The longer baseline has more closely spaced ambiguities, and the number of additional elements is increased to adequately resolve the required ambiguities.

Ultimately, the ability to form fractional baselines is limited by the physical size of the antenna elements since two elements cannot physically overlap. If ambiguity resolution continues to be a problem, a synthetic baseline can be established according to the present invention by arraying antenna elements having the minimum spacing. If the two antenna elements are combined with equal amplitude by using the power combiner 35 (FIG. 1), the phase center of these combined elements lies halfway between the two elements. Thus, if the phase difference between the combined elements and one of the elements is measured, another interferometric pair having a smaller baseline value than that limited by the restriction on physical spacing is formed. For equal amplitude element combining, the synthetic baseline is one-half of the baseline between elements and, consequently, its ambiguities are spaced twice as wide in sin θ space. Other element amplitude combinations can produce phase center values in different locations so that even smaller baseline dimensions are achieved. Using non-equal amplitude combining may require more complicated calibration techniques. Since no additional antenna elements and preamplifiers are required to form synthetic baselines, the cost of the synthetic baseline is less than that for producing actual baseline values.

When the interferometric elements are combined to form a phase center located between the elements, their combined pattern differs from the element pattern. However, because the elements are closely spaced, broad pattern coverage is still achieved. For specific applications, the combined pattern is determined and contrasted with the element coverage requirements to ascertain the suitability of this technique.

The design of practical interferometers provides signal locations over a range of signal directions, e.g., within 45° of the normal to the elements. One reason to limit the angular range of practical designs is that the accuracy of the interferometer is limited by the baseline between elements projected in the direction of the signal. As the signal direction approaches 90°, the baseline becomes vanishingly small and the ability to identify signal direction becomes limited. Also towards 90°, the physical presence of one element can block signal reception by other elements. Beyond 90°, the elements may not have a clear line of sight path for the signal. In operation, the antenna pattern characteristics of the elements are generally selected to match the design field of view requirements. However, the ambiguities do not have the same restrictions. By reducing the antenna pattern levels beyond the design field of view, the sensitivity to signals in these locations is decreased. Similarly, if the signal levels at the elements are not equal, the signal probably does not arrive within the design field of view and can be eliminated from further consideration. In other cases, for example ground-based systems, some of the ambiguities may be located where signals cannot arrive. Thus, ambiguities that would imply the signal is arriving from subterranean locations can be removed from further consideration.

Figure 4:
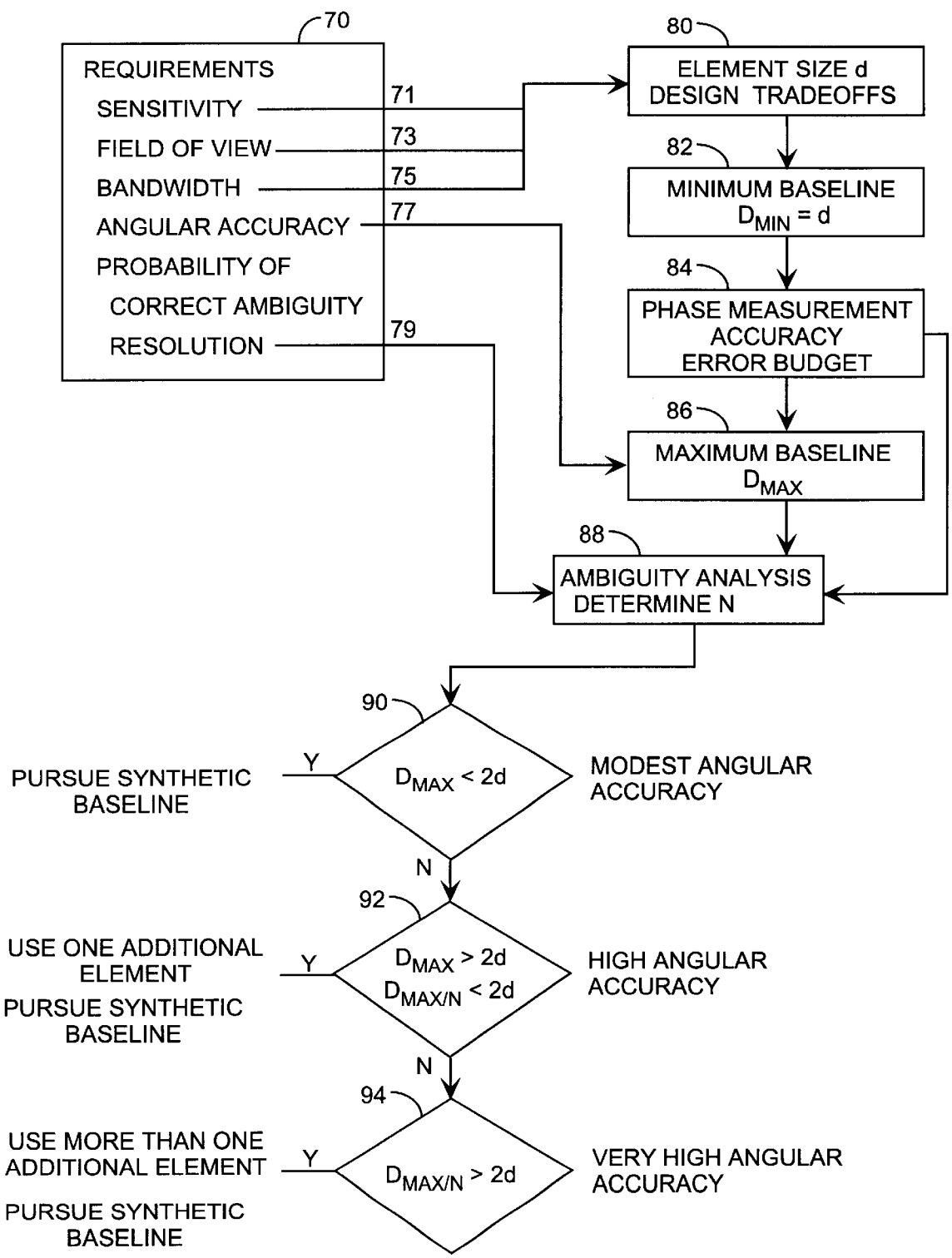
FIG. 4 illustrates how the present invention is applied to practical designs and the interplay between system parameters.

FIG. 4 illustrates the design process for the selection of the number of interferometric elements and their spacing according to the present invention. The process is illustrated for an interferometer providing direction finding in a single plane. Such a design is a common application; for example, determining the direction of terrestrial signals in an azimuth plane. The extension to direction finding in two planes requires an orthogonal baseline and is apparent to those practiced in the art. The process starts with the system requirements 70 that include the sensitivity 71, the field of view 73, the bandwidth 75, the angular accuracy 77, and the probability of correct ambiguity resolution 79. Some iterations on these requirements may be appropriate to satisfy other system constraints. For example, the required angular accuracy 77 may require a baseline dimension greater than which is available for installation, and the angular accuracy requirements may have to be revised to satisfy the physical size constraint imposed by the application.

At step 80 of an exemplary preferred method for resolving interferometric ambiguities according to the present invention, the size of the interferometric element is derived from the sensitivity 71, the field of view 73 and the bandwidth 75 requirements. Evaluation of candidate designs is typically conducted to select a suitable design. At step 82, the element design then identifies an overall element size d that also corresponds to the minimum baseline dimension, $D_{min}$, which equals the element dimension d. Next, at step 84, the phase measurement accuracy is projected by constructing an error budget. In a preferred embodiment, the error budget includes a plurality of terms describing the imperfections of the system; the statistics of these terms are required as well. One imperfection lies with thermal noise limitations; these terms have a zero mean Gaussian distribution that is well known. The system has a detection threshold that is derived from probability of detection requirements, and the thermal error values are based on this threshold value. In practice, the threshold value is exceeded yielding a conservative error value. Other error sources are associated with hardware imperfections. The antennas, for example, may have some errors in their mounting and some variation in their phase center locations over the required bandwidth and field of view. The baseline dimensions are the separation between element phase centers. Careful calibration of the antennas is required and, as appropriate, corrections can be made to compensate for these imperfections. The measurement uncertainty for the phase center locations can be used in the error budget. Cabling is required to connect the elements with the system electronics. Ideally, these cable lengths are identical, but some imprecision is usually unavoidable in practice. Further, variations in the insertion phase length of the cable can occur during operation caused, for example, by thermal changes. These errors can produce non-repeatable bias errors as well as fixed bias offsets that can be compensated for in the processing. Finally, the receiver electronics can have non-ideal phase tracking performance as well as non-repeatable bias errors. The error sources are then combined as a root sum squares (rss) sum of the random components and an algebraic sum of the bias terms. Preferably, effort is made to minimize the bias errors in order to obtain high accuracy; minimum bias errors also center the statistical distribution of the errors for the fractional baselines between the interferometric ambiguities of the overall baseline. This results in equal probability of incorrectly identifying adjacent ambiguities as the correct signal location.

Once the phase measurement accuracy has been determined, the maximum baseline $D_{max}$ is determined at step 86. The value of $D_{max}$ depends on a variety of factors as discussed below. The angular field of view 73 is one factor because the projection of the baseline in the direction of the signal determines the accuracy in part. Thus, the angular accuracy 77 at the extremes of the field of view and at the lowest frequency of the bandwidth 75 establishes the minimum angular accuracy. The phase measurement accuracy (step 84) also is used to determine the maximum baseline $D_{max}$, with increasing phase measurement accuracy decreasing the baseline dimension. As described above, these factors facilitate determination of the maximum baseline value $D_{max}$ according to the present invention.

At step 88, ambiguity analyses are performed, providing the means to determine the required integer fractional values for the baseline selections. The statistics of the error analyses for the phase measurement accuracy (step 84) together with the required probability of correct ambiguity resolution 79 are used in this process for determining N that was previously described with respect to FIG. 3.

According to the exemplary preferred method for resolving interferometric ambiguities illustrated in FIG. 4, the fractional baseline values are now selected at steps 90, 92, 94 depending upon the relative angular accuracy requirements. Step 90 implements a modest angular accuracy requirement. For systems with relatively modest requirements for angular accuracy, only two elements comprising the baseline are required. The criterion used here is that the baseline $D_{max}$ is less two times the element diameter d. When the baseline is less than 2d, an additional element cannot be inserted within the baseline. In this case, ambiguity resolution is accomplished by using synthetic baseline techniques.

Step 92 implements a significantly higher angular accuracy requirement. The ambiguity resolution is provided by one additional element within the baseline and synthetic baseline techniques. For this second case, the baseline exceeds twice the element diameter, 2d, to allow the insertion of an additional element. The baseline is also bounded by when the fractional baseline $D_{max}/N$ exceeds twice the element diameter 2d. The upper bound on the fractional baseline value $D_{max}/N<2d$ results because this is the point at which another element can be inserted within the baseline.

Often, this second case (step 92) results in a situation where the fractional value N produces a fractional baseline value that would result in physical interference between elements. In this case, the highest integer $(N_{max})'$ is selected that permits physical clearance between the baseline element and the fractional baseline element that allows clearance between elements instead of butting the elements together. By selecting this highest integer $(N_{max})'$ for the fractional baseline value: response of the fractional baseline continues to straddle the ambiguities of the overall baseline; the probability of incorrectly mistaking adjacent ambiguities as the correct location continues to be equal; and the probability of correct ambiguity resolution increases slightly.

Step 94 implements a very high angular accuracy requirement. This third case concerns interferometers with very high angular accuracy and two fractional baselines can be used. This case results when $D_{max}/N$ exceeds the two times element diameter 2d. Again, some adjustment in the integer values of N may be made between the two fractional baseline values. The overall objective is to maintain the integer fractional values for each of the baselines and to also locate the smallest fractional baseline element as close as practical to one of the elements in the overall baseline. Thus, the fractional baseline values are $(D_{max}/N'')$ and $(D_{max}/(N'')^2)$ and again the probability of correct ambiguity increases.

Although the present invention has been described in terms of the preferred embodiment above, numerous modifications and/or additions to the above-described preferred embodiment would be readily apparent to one skilled in the art. It is intended that the scope of the present invention extends to all such modifications and/or additions.

We claim:

1. A method for resolving interferometric ambiguities for an interferometer system with antenna elements that define an overall baseline, the method comprising the steps of:

employing an angular accuracy requirement and an achievable phase measurement accuracy to determine an overall baseline dimension for the interferometer system;

selecting a secondary element baseline dimension, for a secondary element to be located within the overall baseline, as an integer fraction of the overall baseline dimension, the secondary element and one of the antenna elements defining a fractional baseline, such that ambiguities produced by the fractional baseline coincide with a portion of ambiguities produced by the overall baseline and such that angular accuracies of interferometric element outputs increase with increases in frequency of signals incident on the interferometric elements; and eliminating from consideration as possible signal directions the ambiguities of the overall baseline that do not coincide with the ambiguities of the fractional baseline.

2. The method for resolving interferometric ambiguities of claim 1, wherein the fractional baseline and a phase measurement accuracy of the fractional baseline are selected to provide sufficient angular accuracy to resolve separations between the ambiguities of the overall baseline.

3. The method for resolving interferometric ambiguities of claim 2, wherein the phase measurement accuracy of the fractional baseline is determined by constructing an error budget composed of one or more error sources that limit phase measurement accuracy.

4. The method for resolving interferometric ambiguities of claim 3, wherein the error sources include one or more of: uncertainties caused by thermal noise sources, imperfections in a phase response of the elements and knowledge of positions of the elements, bias errors resulting from insertion phase differences in cabling, and phase tracking limitations in receiver electronics.

5. The method for resolving interferometric ambiguities of claim 2, wherein a probability of correct ambiguity resolution is derived from statistics and confidence intervals of the phase measurement accuracy, and the integer fraction is selected to meet the statistics and confidence intervals.

6. The method for resolving interferometric ambiguities of claim 1, further comprising the step of:

locating additional elements within the overall baseline if ambiguities still persist.

7. The method for resolving interferometric ambiguities of claim 1, further comprising the steps of:

combining two antenna elements of the interferometric system such that the combined elements have a phase center;

producing a synthetic baseline whose dimension is a separation between one of the combined elements and the phase center of the combined elements; and employing the synthetic baseline to resolve ambiguities that cannot be resolved by baselines between the antenna elements.

8. The method for resolving interferometric ambiguities of claim 7, wherein the dimension of the synthetic baseline is smaller than a separation between the combined elements.

9. The method for resolving interferometric ambiguities of claim 7, wherein the combined elements have the smallest separation there between of any two antenna elements.

10. The method for resolving interferometric ambiguities of claim 7, wherein the combined elements are combined such that the synthetic baseline is one half the size of the baseline between the combined elements.

11. The method for resolving interferometric ambiguities of claim 7, wherein the combined elements are combined with an unequal amplitude combination.

12. The method for resolving interferometric ambiguities of claim 1, wherein the integer fraction is determined from an error budget projection of phase measurement accuracy, a confidence interval of the phase measurement accuracy, and a probability of correct ambiguity resolution to minimize a number of interferometric elements of the system.

13. The method for resolving interferometric ambiguities of claim 1, wherein the ambiguities of the overall baseline are symmetrically displaced from a response of the fractional baseline.

14. A method for resolving interferometric ambiguities for an interferometer system with interferometric elements that define an overall baseline, the method comprising the steps of:

employing an angular accuracy requirement and an achievable phase measurement accuracy to determine an overall baseline dimension for the interferometer system; and inserting one or more additional interferometric elements within the overall baseline such that baseline dimensions of the additional interferometric elements are integer fractions of the overall baseline dimension, the integer fractions being selected to provide ambiguity resolution that meets a required confidence value and to provide interferometric element outputs with angular accuracies that increase with increases in frequency of signals incident on the interferometric elements.

15. The method for resolving interferometric ambiguities of claim 14 wherein, the one or more additional interferometric elements comprise actual antenna elements.

16. The method for resolving interferometric ambiguities of claim 14, wherein the step of inserting one or more additional interferometric elements comprises creating a synthetic baseline by electronically combining the interferometric elements.

17. The method for resolving interferometric ambiguities of claim 16, wherein the dimension of the synthetic baseline is smaller than dimensions of baselines limited by physical separations between the interferometric elements.

18. A method for resolving interferometric ambiguities for an interferometer system with antenna elements, the method comprising the steps of:

combining two elements of the interferometric system such that the combined elements have a phase center;

producing a synthetic baseline whose dimension is a separation between one of the combined elements and the phase center of the combined elements; and employing the synthetic baseline to resolve ambiguities that cannot be resolved by baselines between the antenna elements.

19. The method for resolving interferometric ambiguities of claim 18, wherein the dimension of the synthetic baseline is smaller than a separation between the combined elements.

20. The method for resolving interferometric ambiguities of claim 18, wherein the combined elements have the smallest separation there between of any two elements of the interferometric system.

21. The method for resolving interferometric ambiguities of claim 18, wherein the combined elements are combined such that the synthetic baseline is one half the size of the baseline between the combined elements.

22. The method for resolving interferometric ambiguities of claim 18, wherein the combined elements are combined with an unequal amplitude combination.

23. A method for resolving interferometric ambiguities for an interferometer system with antenna elements that define an overall baseline, the method comprising the steps of:

employing an angular accuracy requirement and an achievable phase measurement accuracy to determine an overall baseline dimension for the interferometer system;

selecting a secondary element baseline dimension, for a secondary element to be located within the overall baseline, as an integer fraction of the overall baseline dimension, the secondary element and one of the antenna elements defining a fractional baseline, such that ambiguities produced by the fractional baseline coincide with a portion of ambiguities produced by the overall baseline;

eliminating from consideration as possible signal directions the ambiguities of the overall baseline that do not coincide with the ambiguities of the fractional baseline;

combining two antenna elements of the interferometric system such that the combined elements have a phase center;

producing a synthetic baseline whose dimension is a separation between one of the combined elements and the phase center of the combined elements; and employing the synthetic baseline to resolve ambiguities that cannot be resolved by baselines between the antenna elements.

24. The method for resolving interferometric ambiguities of claim 23, wherein the dimension of the synthetic baseline is smaller than a separation between the combined elements.

25. The method for resolving interferometric ambiguities of claim 23, wherein the combined elements have the smallest separation there between of any two antenna elements.

26. The method for resolving interferometric ambiguities of claim 23, wherein the combined elements are combined such that the synthetic baseline is one half the size of the baseline between the combined elements.

27. The method for resolving interferometric ambiguities of claim 23, wherein the combined elements are combined with an unequal amplitude combination.

28. A method for resolving interferometric ambiguities for an interferometer system with interferometric elements that define an overall baseline, the method comprising the steps of:

employing an angular accuracy requirement and an achievable phase measurement accuracy to determine an overall baseline dimension for the interferometer system; and inserting one or more additional interferometric elements within the overall baseline such that baseline dimensions of the additional interferometric elements are integer fractions of the overall baseline dimension, the integer fractions being selected to provide ambiguity resolution that meets a required confidence value;

wherein the step of inserting one or more additional interferometric elements comprises creating a synthetic baseline by electronically combining the interferometric elements;

wherein the dimension of the synthetic baseline is smaller than dimensions of baselines limited by physical separations between the interferometric elements.

29. A method for resolving interferometric ambiguities for an interferometer system with interferometric elements that define an overall baseline, the method comprising the steps of:

employing an angular accuracy requirement and an achievable phase measurement accuracy to determine an overall baseline dimension for the interferometer system; and inserting one or more additional interferometric elements within the overall baseline such that baseline dimensions of the additional interferometric elements are integer fractions of the overall baseline dimension, the integer fractions being selected to provide ambiguity resolution that meets a required confidence value;

wherein the step of inserting one or more additional interferometric elements comprises creating a synthetic baseline by electronically combining the interferometric elements to produce a signal output for resolving interferometric ambiguities.

* * * * *